United States Patent [19]
Bednarz et al.

[11] Patent Number: 5,744,083
[45] Date of Patent: Apr. 28, 1998

[54] METHOD FOR MOLDING SEMICONDUCTOR PACKAGES

[75] Inventors: George A. Bednarz; Teong Yu Lim, both of Singapore, Singapore

[73] Assignee: Texas Instruments Incorporated, Dallas, Tex.

[21] Appl. No.: 744,669

[22] Filed: Nov. 6, 1996

Related U.S. Application Data

[62] Division of Ser. No. 262,814, Jun. 21, 1994, Pat. No. 5,624,691.

[51] Int. Cl.$^6$ ............................ B29C 45/14; B29C 45/02
[52] U.S. Cl. ........................... 264/272.14; 264/272.17
[58] Field of Search ..................... 264/272.14, 272.17, 264/328.4; 425/588, 116, 544, 117, 572, 573

[56] References Cited

U.S. PATENT DOCUMENTS

| | | | |
|---|---|---|---|
| 4,126,292 | 11/1978 | Saeki et al. | 425/588 |
| 5,071,334 | 12/1991 | Obara | 264/272.17 |
| 5,123,826 | 6/1992 | Baird | 264/272.17 |
| 5,139,728 | 8/1992 | Baird | 264/272.17 |

FOREIGN PATENT DOCUMENTS

| | | | |
|---|---|---|---|
| 0539108 | 4/1993 | European Pat. Off. | 425/572 |
| 2446863 | 4/1976 | Germany | 425/572 |
| 57-8138 | 1/1982 | Japan | 264/272.17 |
| 61-247038 | 11/1986 | Japan | 425/588 |
| 63-49413 | 3/1988 | Japan | 264/272.17 |
| 2-245310 | 10/1990 | Japan | 425/543 |
| 3-250635 | 11/1991 | Japan | 264/272.17 |

*Primary Examiner*—Angela Y. Ortiz
*Attorney, Agent, or Firm*—W. James Brady, III; Richard L. Donaldson

[57] ABSTRACT

The invention is to a transfer mold design utilized with conventional transfer encapsulation. The design utilizes a varying runner cross section with an intermediate varying depth well or reservoir from which a constant gate depth and gate entry angled to the mold cavities is employed. The method and apparatus of the invention is applicable to single and multi-plunger molding utilizing thermoset and thermoplastic encapsulants for semiconductors.

2 Claims, 6 Drawing Sheets

| Entry | Reservoir Gate | | Reservoir | | Cavity Gate | | Entry Angle |
|---|---|---|---|---|---|---|---|
| | W | D | $W_R$ | $D_R$ | $W_C$ | $D_C$ | |
| A | 1.50 | 0.587 | 18.81 | 8.75 | 2.00 | 0.305 | 30° |
| B | | 0.689 | | | | | |
| C | | 0.751 | 18.30 | 7.30 | | | |
| D | | 0.789 | 17.27 | 4.38 | | | |
| E | | 0.851 | 16.80 | 3.05 | | | |
| F | | 1.050 | 16.17 | 1.25 | | | |
| G | | 1.250 | | | | | |
FIG. 4
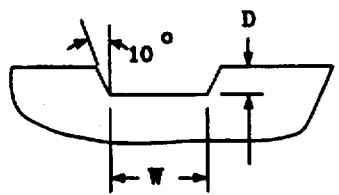
FIG. 5
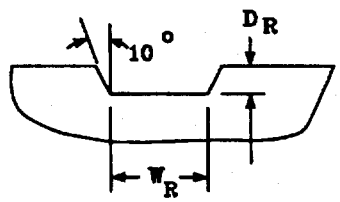
FIG. 6
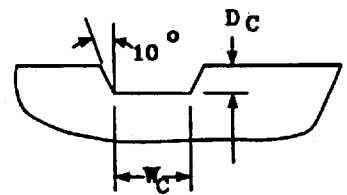
FIG. 7

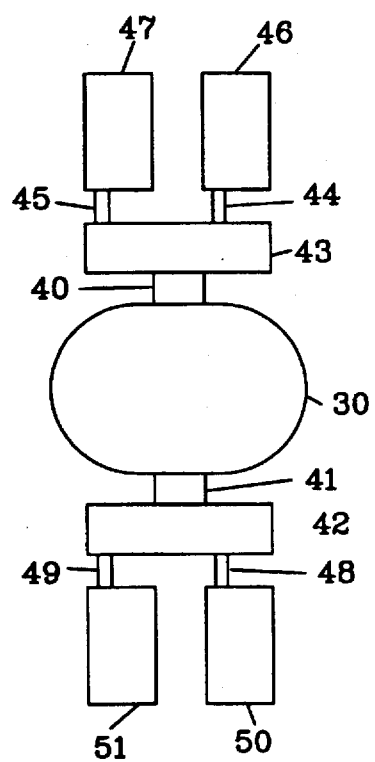
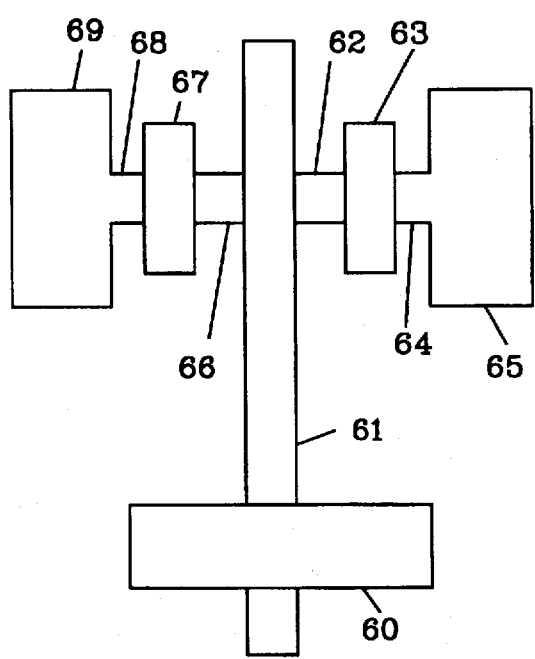
FIG. 8
FIG. 9

METHOD FOR MOLDING SEMICONDUCTOR PACKAGES

This is a division, of application Ser. No. 08/262,814, filed Jun. 21, 1994, now U.S. Pat. No. 5,624,691.

FIELD OF THE INVENTION

The invention relates to transfer molds, and more particularly to a transfer mold having a varying runner cross section and varying depth well/reservoir between the runner and the mold cavities.

BACKGROUND OF THE INVENTION

The transfer mold encapsulation process has been used with thermoset molding compounds, such as epoxy molding compounds, for about 30 years. Conventional transfer molds used in this process are typically high density molds with as few as 20 cavities to over 800 cavities per molded encapsulation shot. As the demand for higher quality, as imposed by the semiconductor industry continues, encapsulation in high density transfer molds falls short of meeting current quality goals for wire sweep, lead frame paddle tilt and internal voids. All three noted quality defects also potentially can result in reliability problems, especially as semiconductor devices, including integrated circuit devices, become larger in relationship to their molded plastic package size, and as lead counts continue to increase. This is because the cavities containing the devices are filled at different times, with different flow rates and material temperatures, having varying viscosities, because of the single transfer plunger, chase runner, cavity gate geometry and position. This leads to a typical "Christmas tree" pattern during the mold filling process.

Industry, over the years, has taken two primary mold design approaches to improve the quality of encapsulated devices. One approach has been to balance fill the mold by varying the runner cross section (taper) in the mold chase which typically holds two lead frame strips with multiple wire bonded devices. In addition, the gate entry angles into the cavities where the devices are located were also varied with the gate depth being constant. The second approach is to use multiple transfer plungers to fill the cavities containing the wire bonded devices on the strip simultaneously. Both approaches improve the quality of the molded device package, with the multiplunger approach being somewhat superior because of its better fill balance.

In the first approach, the "Christmas tree" effect is minimized, but not eliminated. The material melt temperature is also not consistently the same and therefore the melt viscosity still varies. Since the melt viscosity applies the material force as the material fills the cavity, the noted defects are not totally eliminated.

The second approach, the multiplunger mold, works to a greater degree of success versus the balanced fill approach. It, however, is deficient primarily since the process does not use dielectrically preheated material. As a result, there is a temperature gradient for the material as it fills the cavity. Because of the temperature gradient, the melt viscosity varies during the filling process of each cavity. Filling therefore is not perfectly uniform.

SUMMARY OF THE INVENTION

The invention is to a transfer mold design utilized with conventional transfer encapsulation. The design utilizes a varying runner cross section with an intermediate varying depth well or reservoir from which a constant gate depth and gate entry angled to the mold cavities is employed. The design provides a double material shearing action as the material leaves the varying cross section runner to the varying depth well/reservoir and then through the constant angle/constant depth gate in the cavity. The use of the well/reservoir, the double shearing of the material and the geometry of the filling channels in the mold produce a melt viscosity that is more uniform during all cavity filling. The uniform melt viscosity produces high quality molded devices without reducing production rates, or producing excessive gate wear when using conventional transfer molding with transfer process control.

The well/reservoir design of the present invention works well with all types of molded semiconductor packages, and works with multiplunger molds, both manual and auto molding. The uniform viscosity produces minimizes wire sweep, lead frame paddle tilt and ensures good cavity packing to minimize void formation.

In one example of the invention, a transfer mold for semiconductor devices has a tapered runner through which mold compound is introduced into the mold, a plurality of mold cavities positioned along the runner; and a plurality of varying size reservoir cavities, one reservoir cavity between the runner and each mold cavity.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 4 is a table showing examples of dimensions for the reservoir gate, reservoir and cavity gates;

FIGS. 5, 6 and 7 show the differing dimensions for the reservoir gates, reservoirs and cavity gates for different positions along the runner;

FIG. 8 shows an embodiment for reservoir/wells connected to the a multi-plunger mold pot;

FIG. 9 shows an embodiment using primary and secondary runner with the reservoir connected between the secondary runner and the device mold cavity;

DESCRIPTION OF A PREFERRED EMBODIMENT

Figure 1A:
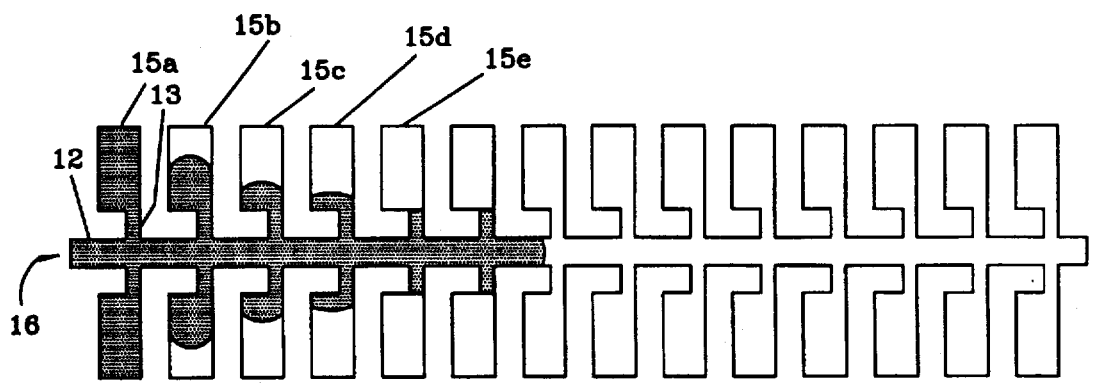
FIGS. 1a and 1b illustrate unbalanced flow producing a "Christmas Tree" effect in prior art molds.

FIG. 1 illustrates a prior art flow of mold compound flow through a central runner 12, through gates 13 to mold cavities 15. Runner 12 supplies mold compound, as indicated by arrow 16, through gates 13 to mold cavities 15 to form the semiconductor packages in molds 15. FIG. 1 shows the "Christmas Tree" effect of all the package molds not being completely molded at the same time. The package in mold 15a is fully molded while in those molds 15b through 15e are only partially filled at this point in time. The remaining mold cavities do not contain mold compound. This results from an uneven flow of mold compound through runner 12 and into the mold cavities 15 through gates 13.

Figure 1B:
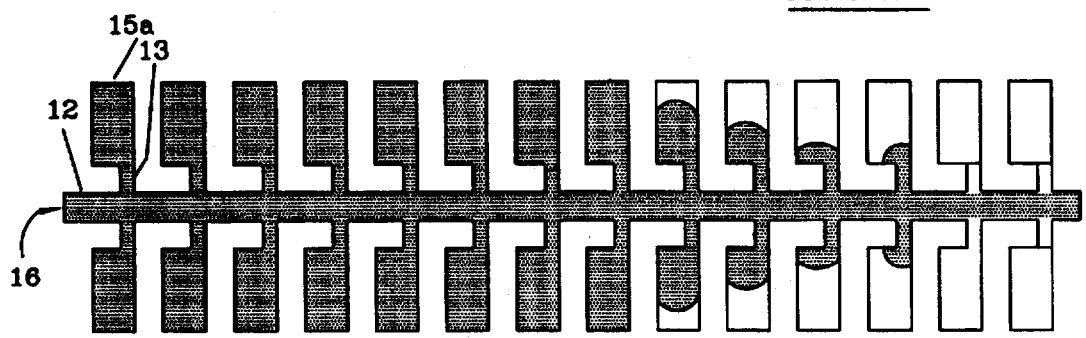

FIG. 1b shows the flow of mold compound at a time subsequent to that of FIG. 1a. The mold compound has filled runner 12, but not all of the mold cavities 15 have been filed.

Figure 2:
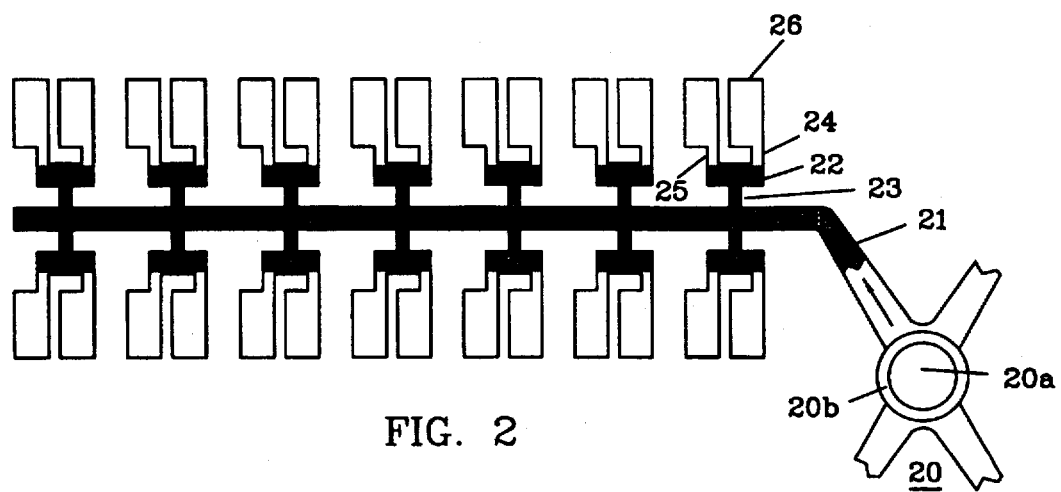
FIG. 2 illustrate balanced mold compound flow in the present invention.

FIG. 2 is a top view of a mold 20 according to the present invention showing mold compound flow into the well/ reservoirs 22 between the runner 21 and mold cavity 26. Plunger 20a forces mold compound from cull area 20b into runner 21. From runner 21 mold compound enters reservoirs 22 via gate 23. Runner 21 is tapered from a larger size at the point the mold compound enters the runner 21 from plunger 20a, to a smaller size at the end of the runner 21. The actual dimensions of each of the gates 23 and reservoirs 22 depend upon the location along runner 21. Because of these dimensional variations, the mold compound will completely fill runner 21 and all of the gates 23 and reservoirs 22 at the same time. As a result of this simultaneous filling of all of the reservoirs 22, each mold cavity 26 will be filled at the same time via an associated cavity gate 24 or 25, producing uniform molded packages.

Figure 3:
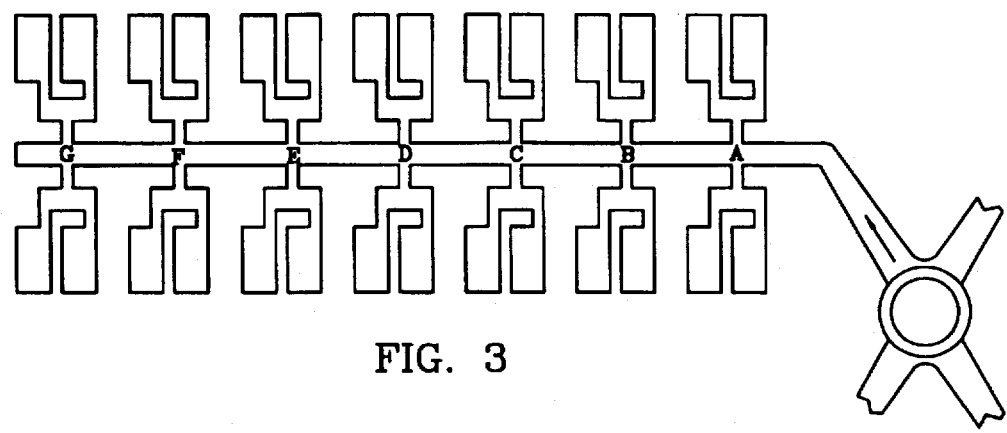
FIG. 3 is a top view showing the gate and the well/reservoirs between the runner and mold cavity.

In FIG. 3, each runner/reservoir gate location is marked with a letter from A through G. Using these gate designations along runner 21, the actual dimensions of the reservoir gates 23, reservoirs 22 and cavity gates 24, 25 are shown in FIG. 4, for a 20 pin DIP device. The reservoir gates 23 have dimensions W and D. The reservoir 22 has dimensions $W_R$ and $D_R$, and the cavity gates 24, 25 have dimensions $W_C$ and $D_C$.

The table in FIG. 4 shows that the entry at each reservoir gate location, A-G, all have a common dimension W. This is the gate width. The gate height D varies with position, A-G. The dimension D is actually one-half mold depth since only, for example, the bottom half of the mold is shown. The top half would also have a depth of D. The dimensions are referenced from the parting line, between the two halves of the mold 20.

Each reservoir 22 gets progressively smaller from position A through G. This ensures that, for example, the reservoir at position G will fill in approximately the same time as the reservoir at position A. This results from the fact that the reservoir at G is smaller than and will fill as fast as the reservoir at A. Since the mold compound flow is greater at A, the larger capacity reservoir at A will fill just as fast as the lower capacity reservoir at G. The cavity gates 24, 25 all have the same dimension.

Runner 21 is tapered from A to G. The width of runner 21 remains constant, for example 7.7 mm, but the depth decreases from A to G. For example, the depth may vary from 6.65 to 2.55 mm. Through the use of the tapered runner 21 and the varying gate size from the runner 21 to the well/reservoirs 22, all reservoirs 22 fill at the same rate, hence each mold cavity 26 fills at the same rate as the other mold cavities 26.

FIG. 8 shows a mold where molding is direct from the multiplunger mold-single pot. In this configuration, runners are not used. Mold compound flows directly from plunger 30 to gates 40 and 41. Gate 40 connects to reservoir 43, and gate 41 connects to reservoir 42. Each reservoir is connected to two gates each, 44, 45 and 48, 49 with, each gate leading to a package mold cavity 46, 47, 50 and 51, respectively. Each reservoir 43 and 42 fills and mold compound flows into mold cavities 46, 47, 50 and 51 simultaneously.

FIG. 9 illustrates a multiple runner configuration where mold compound flows from primary runner 60 through secondary runner 61, to gate 62 and 66. Flow from gates 62 is into reservoir 63, through gate 64 and into mold cavity 65. Flow from gate 66 is into reservoir 67, gate 68 and into mold cavity 69. Each reservoir in FIG. 9 only supplies one mold cavity, but multiple mold cavities can be supplied as in FIG. 8.

Figure 10:
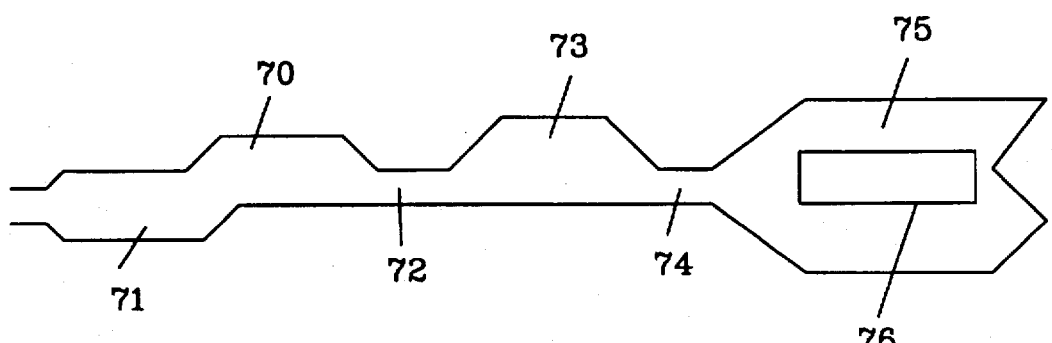
FIG. 10 is a cross-sectional view showing the runner, reservoir and cavity for runner using offset runners with a transition between top and bottom runner.

FIG. 10 is a cross sectional view of a mold that utilizes a top runner 70 reservoir gate 72, top reservoir 73, cavity gate 74 and cavity 75 enclosing a semiconductor chip 76. A similar configuration, not illustrated would extend from the lower runner 71.

Figure 11:
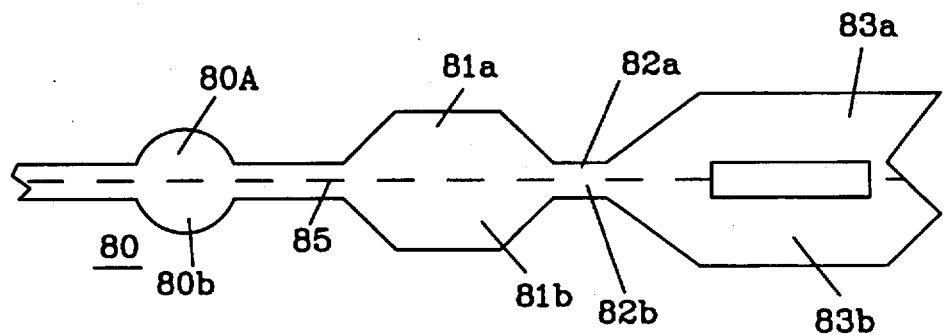
FIG. 11 is a cross-sectional view showing a full round runner showing the parting line between top and bottom section of a mold, with top and bottom reservoirs and top and bottom gates.

FIG. 11 shows a mold that utilizes a full round runner 80 having a top part 80a, and a lower part 80b. Well 81 has a top part 81a and a lower part 81b. Also gate 82 and mold cavity 83 each have upper parts 82a and 82b and lower parts 83a and 83b. The parting line for the mold is shown at 85.

Figure 12:
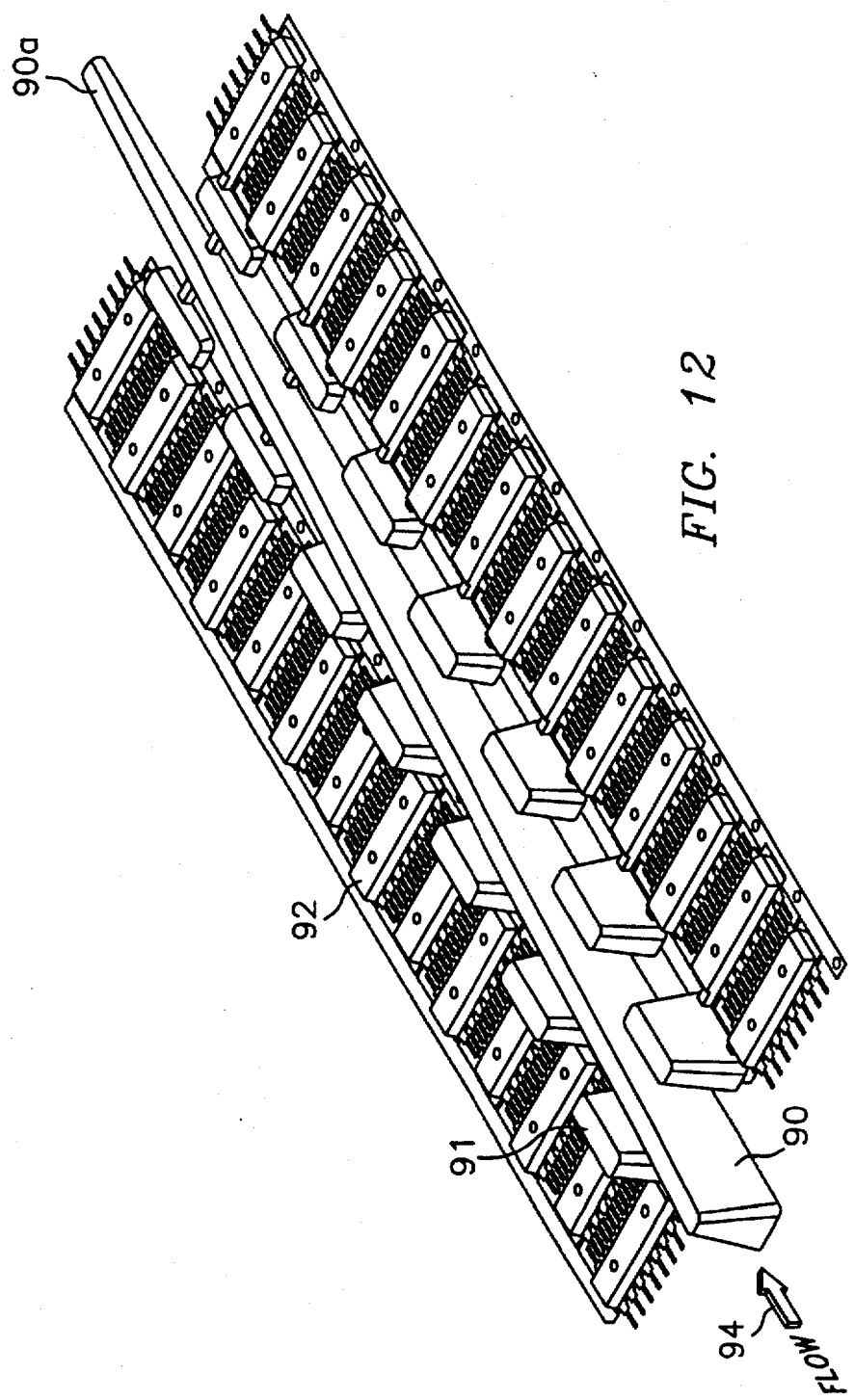
FIG. 12 shows molded devices with reservoirs/wells and tapered runner attached.

FIG. 12 shows a molded integrated strip showing the molded well/reservoirs 91, tapered runner 90 and devices 92. Runner 90 tapers from the compound input end, shown by arrow 94, to the end 90a of the runner. Each reservoir 91 is shown decreasing in size from the runner input end 90 to runner end 90a. All devices 92 are molded at the same time, eliminating the "Christmas Tree" effect as illustrated in FIG. 1a and 1b. The design using the varying runner cross section with the intermediate varying depth reservoir and constant gate depth and gate entry angle to the cavities produces a mold that provides a uniform compound flow during cavity filling.

What is claimed:

1. A method for molding semiconductor packages in a transfer mold, comprising the steps of:

flowing mold compound into a runner, the runner tapered from a first cross-section at a first end where the mold compound enters the runner to a second cross-section at a second end, the first cross-section being larger than the second cross-section;

flowing mold compound from the runner into a plurality of reservoir gates, each of the reservoir gates having a first end connected to the runner and a second end, each of the reservoir gates having a cross-section, the cross-sections of the reservoir gates increasing from the first end of the runner to the second end of the runner;

flowing mold compound from the reservoir gates into a plurality of reservoirs, each reservoir connected to a second end of a reservoir gate, each reservoir having a cross-section that is larger than the cross-section of the reservoir gate to which it is connected, the cross-sections of the reservoirs decreasing from the first end of the runner to the second end of the runner;

flowing mold compound from the reservoirs into a plurality of cavity gates, each cavity gate having a first end connected to a reservoir and a second end, each cavity gate having a cross-section that is smaller than the cross-section of the reservoir to which it is connected; and flowing mold compound from the cavity gates into a plurality of cavities containing semiconductor packages and filling the cavities, each cavity connected to a second end of a cavity gate.

2. The method of claim 1 in which said step of flowing mold compound from the reservoirs into a plurality of cavity gates includes flowing mold compound from pairs of cavity gates to an associated reservoir.

\* \* \* \* \*